(12) United States Patent
Reiff (10) Patent No.: US 10,780,756 B1
(45) Date of Patent: Sep. 22, 2020

(54) PURGING DUST BOOT

(71) Applicant: RB Distribution, Inc., Colmar, PA (US)

(72) Inventor: Thomas Allan Reiff, Lafayette Hill, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/392,027

(22) Filed: Apr. 23, 2019

(51) Int. Cl.
| | |
|---|---|
| *F16C 11/00* | (2006.01) |
| *B60G 7/00* | (2006.01) |
| *F16C 11/06* | (2006.01) |
| *F16J 3/04* | (2006.01) |
| *F16D 3/84* | (2006.01) |

(52) U.S. Cl.
CPC .......... *B60G 7/005* (2013.01); *F16C 11/0671* (2013.01); *F16J 3/046* (2013.01); *B60G 2204/416* (2013.01); *B60G 2204/4308* (2013.01); *F16D 2003/846* (2013.01); *Y10S 277/928* (2013.01); *Y10T 403/32729* (2015.01)

(58) Field of Classification Search
CPC .......... Y10T 403/32729; Y10T 403/31; Y10T 403/315; Y10T 403/32647; Y10T 403/32663; F16C 11/068; F16C 11/0671; Y10S 277/928; B60G 7/005; B60G 2204/416; B60G 2204/4308; F16J 3/046; F16D 2003/846
See application file for complete search history.

(56) References Cited

U.S. PATENT DOCUMENTS

| | | | | |
|---|---|---|---|---|
| 3,041,885 | A | * | 7/1962 | Christiansen ............ F16J 3/046 403/50 |
| 3,135,539 | A | * | 6/1964 | Ulderup ............... F16C 11/0628 277/635 |
| 3,187,590 | A | * | 6/1965 | Duggan .............. F16C 11/0671 137/846 |
| 3,208,290 | A | * | 9/1965 | Mathues ............. F16C 11/0671 277/635 |
| 3,248,955 | A | | 5/1966 | Templeton |
| 3,572,379 | A | * | 3/1971 | Popa ................... F16C 33/6622 137/849 |
| 3,858,412 | A | * | 1/1975 | Fisher ..................... F16D 3/227 464/146 |
| 3,896,849 | A | * | 7/1975 | Ervin .................... F16K 15/147 137/847 |
| 4,003,666 | A | | 1/1977 | Gaines |
| 4,003,667 | A | * | 1/1977 | Gaines .................. F16C 11/068 277/635 |
| 5,472,072 | A | * | 12/1995 | Bumgarner ........... F16F 9/3278 188/322.12 |
| 5,536,019 | A | * | 7/1996 | Bryant .................... F21S 45/33 277/634 |

(Continued)

FOREIGN PATENT DOCUMENTS

| | | | | |
|---|---|---|---|---|
| DE | 1181014 | B * | 11/1964 | ............... F16J 3/046 |
| DE | 102017011793 | B3 * | 5/2019 | ............... F15B 7/08 |

(Continued)

*Primary Examiner* — Matthew R McMahon
(74) *Attorney, Agent, or Firm* — Volpe and Koenig, P.C.

(57) ABSTRACT

A boot with a body cavity that protects a moveable joint and retains lubricant associated with the joint is disclosed. The wall of the boot body includes a venting aperture that is protected by a surrounding barrier structure.

13 Claims, 8 Drawing Sheets

(56) References Cited

U.S. PATENT DOCUMENTS

| | | | | |
|---|---|---|---|---|
| 5,568,930 | A * | 10/1996 | Urbach | F16C 11/0671 277/635 |
| 5,695,202 | A * | 12/1997 | Cartwright | B62D 1/20 277/636 |
| 5,765,837 | A * | 6/1998 | Schwarzler | F16D 3/845 277/636 |
| 6,179,717 | B1 * | 1/2001 | Schwarzler | F16J 3/046 464/175 |
| 6,308,959 | B1 * | 10/2001 | Sokolihs | F16J 3/046 277/394 |
| 7,063,331 | B2 | 6/2006 | Iwano | |
| 7,077,296 | B2 * | 7/2006 | Brown | B65D 47/2031 222/185.1 |
| 7,670,078 | B2 * | 3/2010 | Elterman | F16C 11/0671 277/635 |
| 7,704,007 | B2 * | 4/2010 | Elterman | F16D 3/845 277/635 |
| 7,862,250 | B2 * | 1/2011 | Kuru | F16C 11/068 403/134 |
| 8,291,810 | B2 * | 10/2012 | Hey | F16J 3/046 92/87 |
| 9,470,271 | B2 * | 10/2016 | Connor | F16D 3/845 |
| 10,175,068 | B2 * | 1/2019 | Chambers | B60K 37/02 |
| 10,274,020 | B2 | 4/2019 | Cassell | |
| 10,563,692 | B1 * | 2/2020 | Reiff | F16C 33/726 |
| 2007/0059092 | A1 | 3/2007 | Elterman | |
| 2009/0232589 | A1 | 9/2009 | Kuru | |
| 2011/0074119 | A1 | 3/2011 | Deane et al. | |
| 2017/0292564 | A1 | 10/2017 | Lonergan, III | |
| 2018/0258983 | A1 | 9/2018 | Reddehase | |

FOREIGN PATENT DOCUMENTS

| | | | | |
|---|---|---|---|---|
| EP | | 1048865 A2 * | 11/2000 | F16D 3/845 |
| JP | | 57208361 A * | 12/1982 | F16J 3/046 |

* cited by examiner

PURGING DUST BOOT

FIELD OF INVENTION

The present invention relates generally to a cover for a suspension assembly that is often referred to as a dust boot. Such dust boots are commonly used with steering components like ball joint assemblies. The dust boot of the invention relates most particularly to pressure generated by lubrication that is subject to movement of the lubrication as a result of active movement of the assembly.

BACKGROUND

Movable joints are commonly used in vehicle suspension systems. Such applications typically require the use of a boot to protect the joint from dirt, debris and other contaminants that may cause the joint surfaces to erode. Many movable joint assemblies include a lubricant that surrounds the joint and is contained by the boot. The movement of the joint and flexing of the boot can cause internal pressure on the lubricant. To relieve that pressure, the boot may have a small opening to relieve pressure during active movement of the assembly. However, such an opening can allow contaminants to enter the assembly and degrade its operation or cause pre-mature failure. Accordingly, it is desirable to have a boot that allows pressure relief and limits the ingress of contaminants.

SUMMARY

A suspension assembly boot that protects a moveable joint and contains a lubricant associated with the joint is disclosed. The dust boot of the present application includes at least one venting aperture that is surrounded and protected by a structure that limits the ingress of foreign matter into the boot as a result of the venting aperture.

DETAILED DESCRIPTION OF THE PREFERRED EMBODIMENTS

Figure 1:
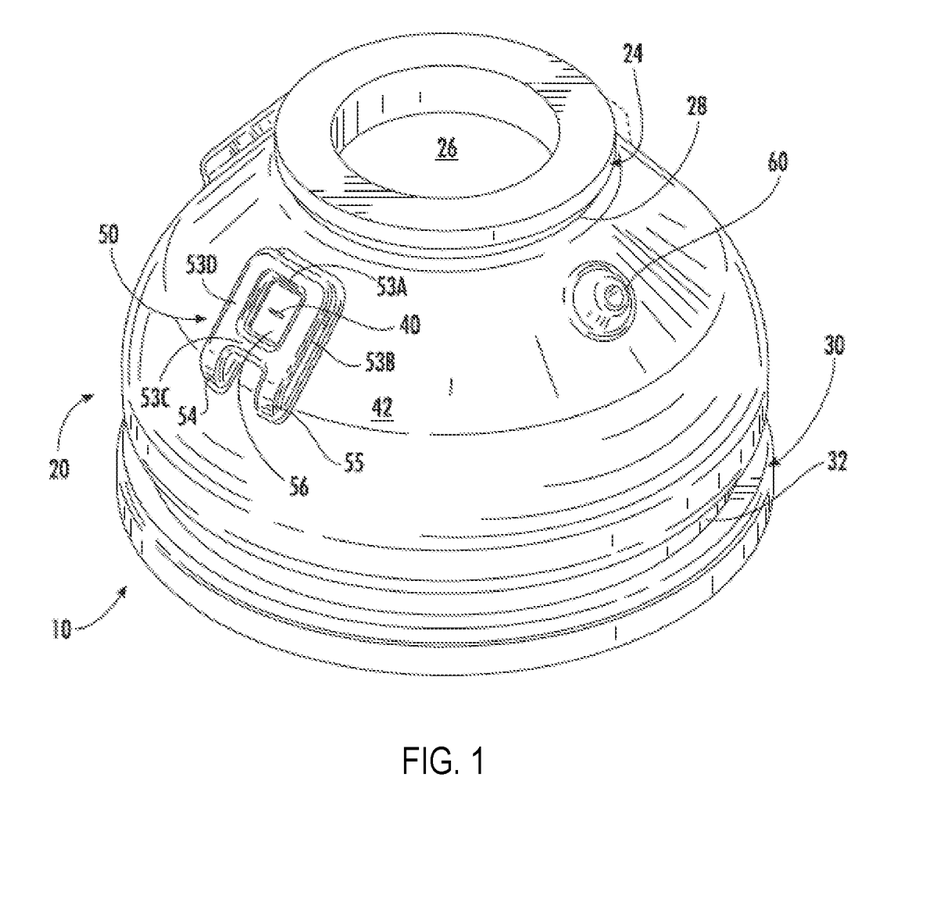
FIG. 1 is a perspective view of a boot in accordance with the invention.
Figure 4:
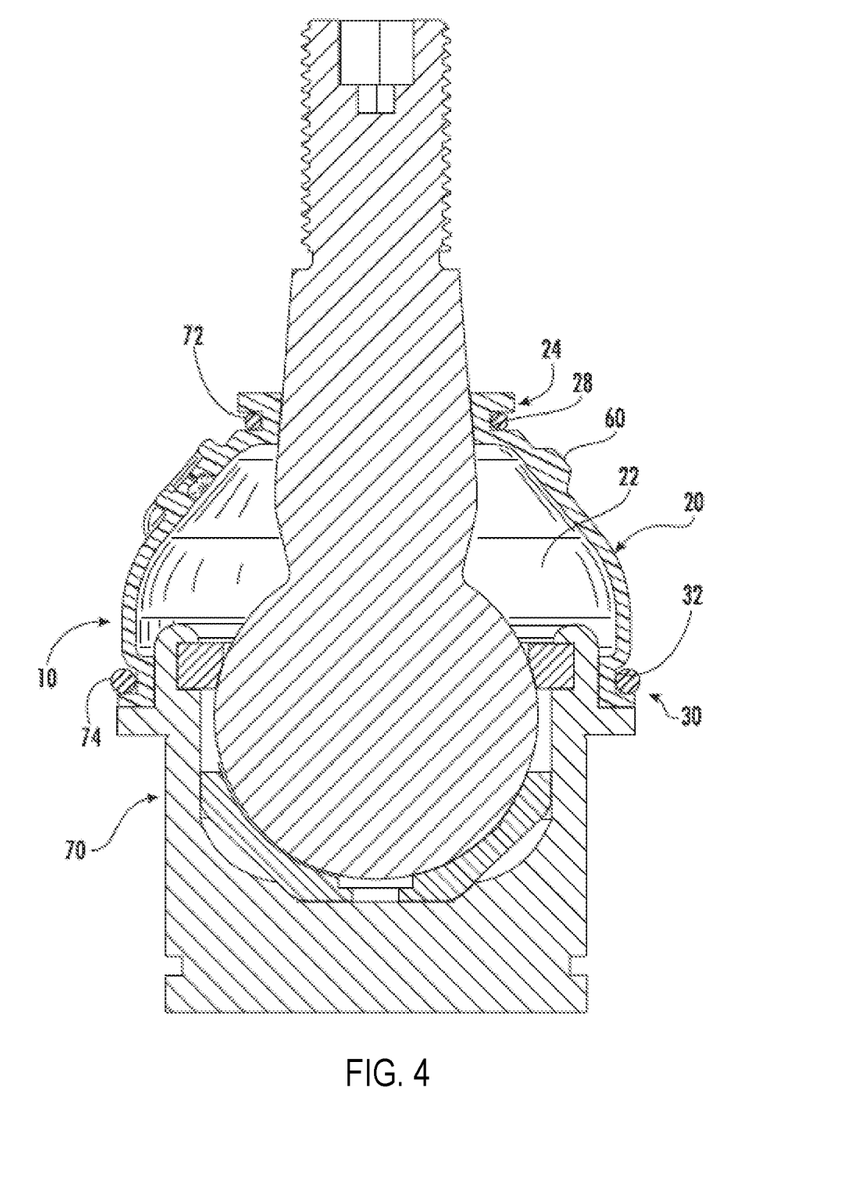
FIG. 4 is a section along line 4-4 of FIG. 3.

With reference to FIG. 1, the boot 10 has a body portion 20 that is generally dome shaped and defines an interior lubrication cavity, see 22 in FIG. 4. The body portion 20 has circular upper end 24 that has an opening 26 and a recess 28 that joins with the top of the body portion 20. The body portion 20 has a circular lower end 30 and a recess 32 that joins with the bottom of the body portion 20.

Figure 3:
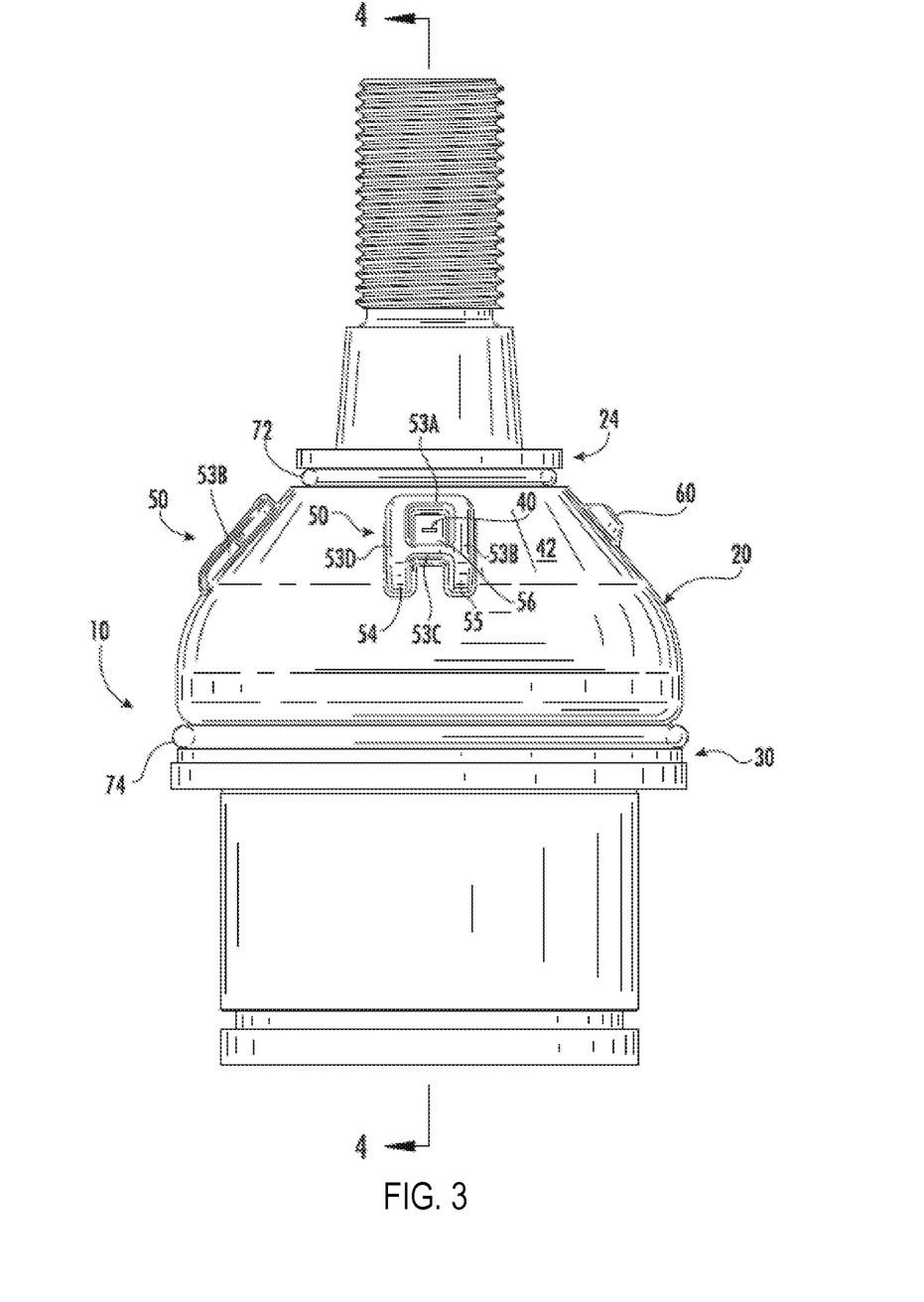
FIG. 3 illustrates the boot of FIG. 1 assembled on a ball joint assembly.

The boot 10 is molded of a flexible material, such as rubber or polyurethane, and includes at least one pressure relief slot 40 that extends through dome wall 42 and into lubrication cavity. The external termination of the pressure relief slot 40 is coplanar with the exterior of dome wall 42. A generally rectangular protective barrier 50 raises up from the exterior of the dome wall 42 and surrounds the pressure relief slot 40. The protective barrier 50 has an outer face that generally follows the contour of the dome wall 42, see FIGS. 3 and 4. The protective portion of protective barrier 50 is largely established by the side walls 53A through 53D. The sidewalls 53A through 53D are spaced from the pressure relief slot 40 and create a recessed flat surface area 56 that is around the pressure relief slot 40 and within the sidewalls 53A through 53D. The lower legs 54 and 55 extend from the protective barrier 50 and provide additional stress relief and force distribution for the protective barrier and the dust boot 10.

Figure 2:
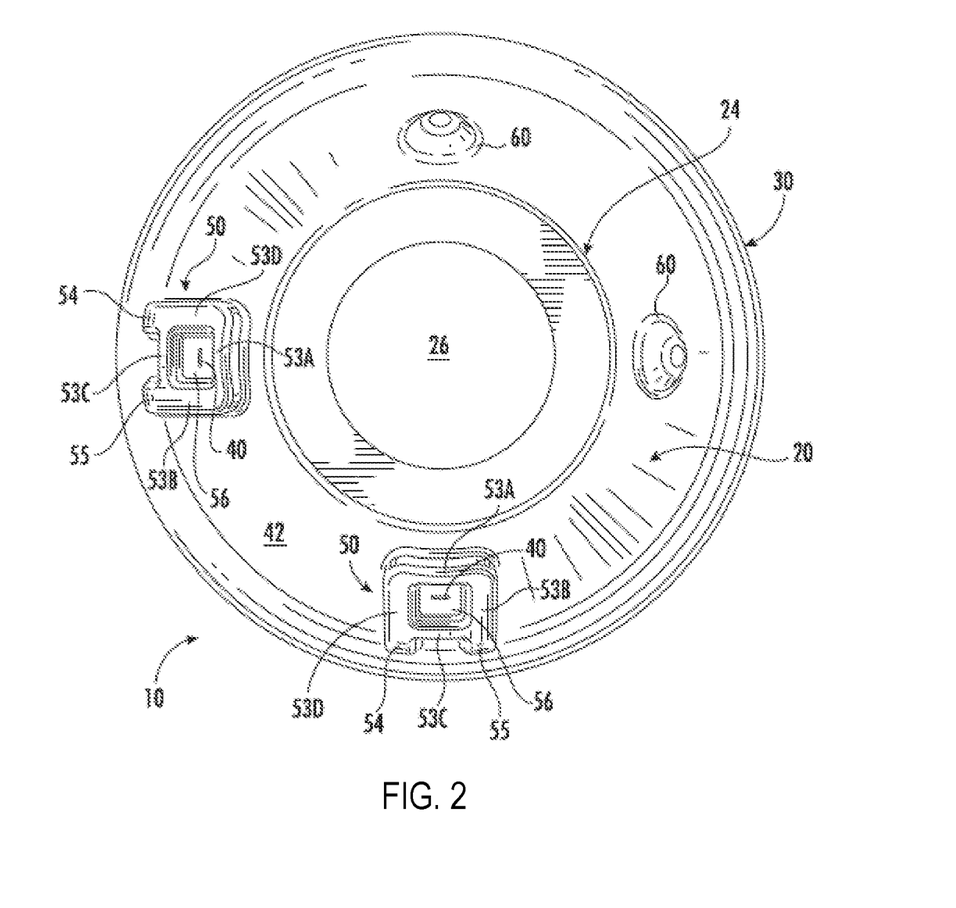
FIG. 2 is a top view of the boot shown in FIG. 1.

As illustrated in FIG. 2, the boot 10 may include a second protective barrier 50. In addition, the preferred embodiment includes at least one projection 60 on the body portion 20. As depicted in FIG. 2, the boot 10 has two protective barriers 50 and two projections 60. The barriers and 50 and projections 60 may be alternated or grouped according to the application. In addition, a single barrier 50 and a single projection 60, preferably, are positioned opposite to each other. It is preferred that the selected number of barriers and projections be positioned so that they are equidistant from each other around the dome wall 42.

Figure 5:
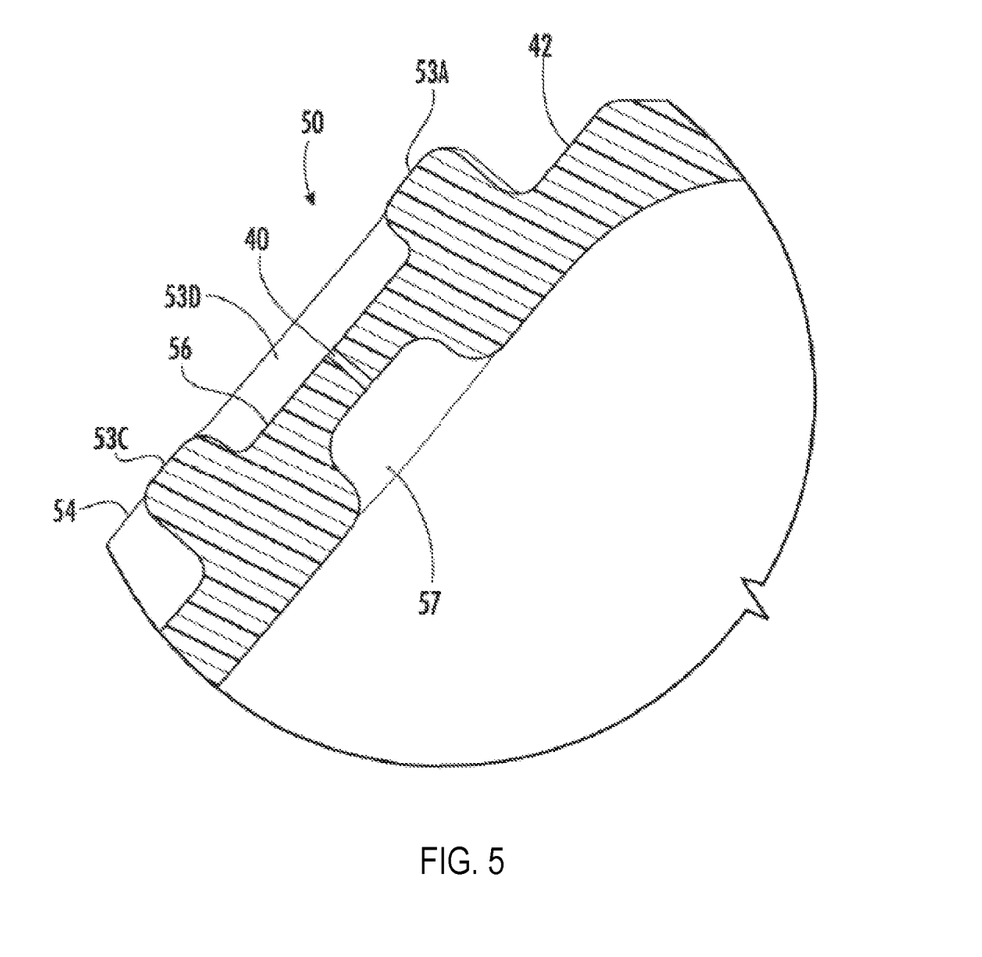
FIG. 5 is an enlarged view of the encircled Section 5 of FIG. 4.
Figure 6:
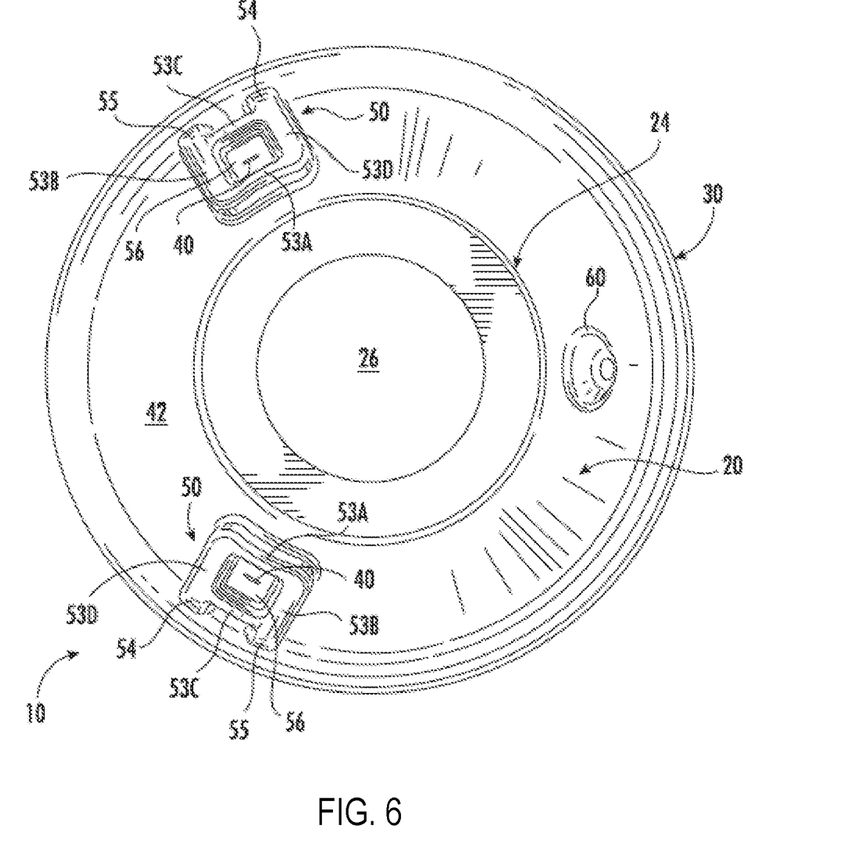
FIG. 6 is a top view of another embodiment of the boot.
Figure 7:
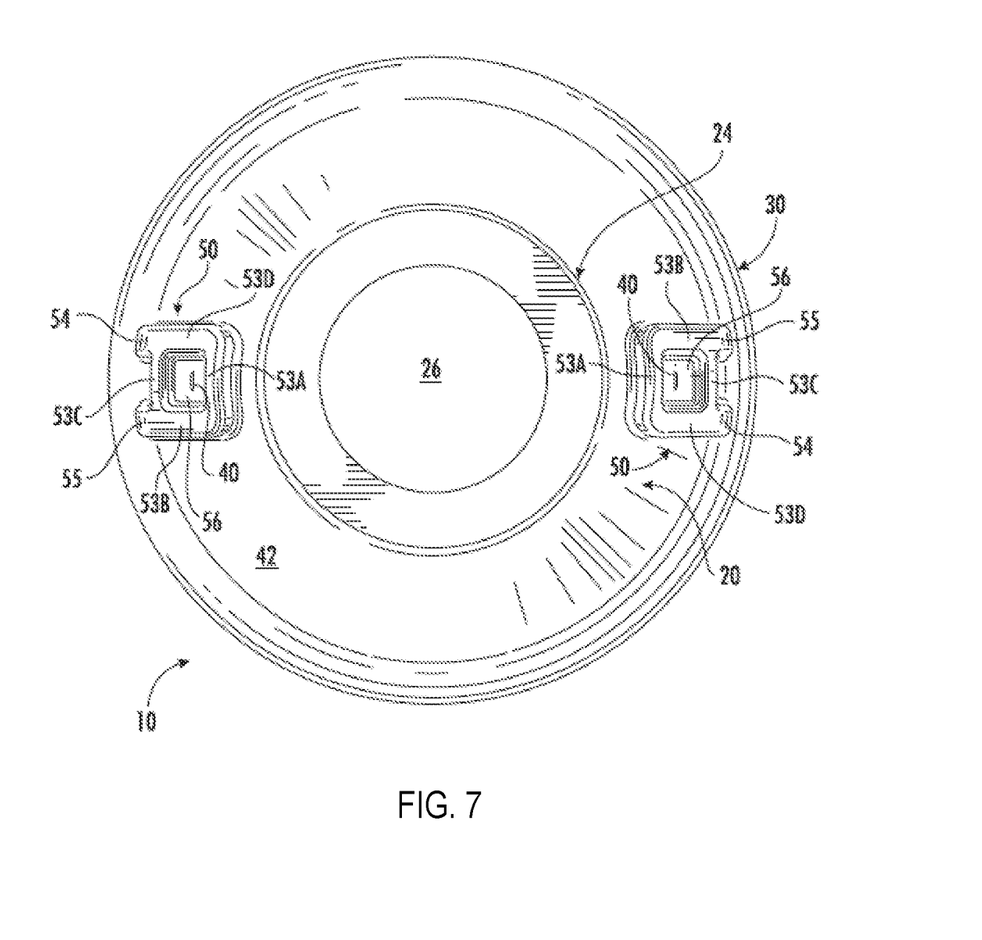
FIG. 7 is a top view of yet another embodiment of the boot.
Figure 8:
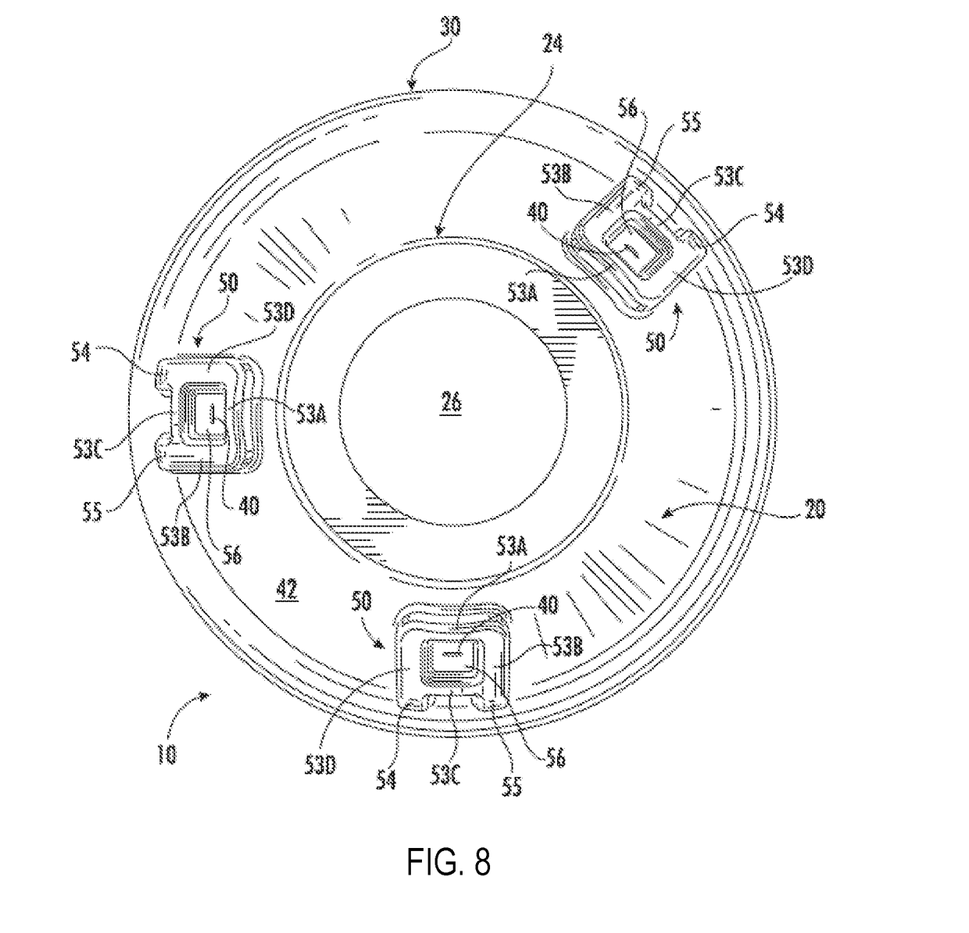
FIG. 8 is a top view of yet another embodiment of the boot.

With reference to FIGS. 4 and 5, the structures for the protective barrier 50 and the projection 60 will be explained in more detail. The body portion 20 generally has a uniform thickness throughout with the exception of the protective barrier 50 and the projection 60. The projection 60 has increased material that forms the projection outwardly from the exterior of the dome wall 42. The interior of the dome wall 42 beneath the projection 60 remains constant with the overall interior.

With reference to FIG. 5, the protective barrier 50 has increased material in the sidewalls 53A through 53D and reduced material in the recessed flat surface area 56 that includes slot 40. An interior recess 57 is formed in the interior wall of the body portion 20 to create a flow path toward the slot 40. The reduced material in surface area 56 results in more flexible and easier access to the slot 40.

Through the combination of varied material thickness and spacing of the protective barrier or barrier 50 and the projection or projections 60, the boot 10 retains sufficient strength while having the desired flexibility. The combination of protective barriers and projections also help to distribute stress and contribute to boot life.

FIG. 4 illustrates a ball joint assembly with a dust boot according to the invention. The dust boot 10 is fitted to the ball joint assembly 70 in the usual manner and retained by securing rings 72 and 74 in the grooves 28 and 32.

What is claimed is:
1. A dust boot comprising:
a body having a first open end, a second open end opposite the first open end and an interior cavity defined between the first open end and the second open end;
at least one relief vent that is positioned in the body between the first open end and the second open end and extends between an outer surface of the body and the interior cavity; and
at least one protective barrier that comprises: a plurality of walls defining a projection on the outer surface of the body that projects from the outer surface of the body and surrounds the at least one relief vent; and, at least one of the plurality of walls defining the projection includes a dependent extension.

2. The dust boot of claim 1, wherein the plurality of walls of the at least one protective barrier have outer surfaces that are parallel to the outer surface of the body.

3. The dust boot of claim 1, wherein the at least one protective barrier is generally rectangular.

4. The dust boot of claim 1, wherein the first open end and the second open end each include at least one groove.

5. The boot of claim 4, wherein the at least one groove in the first open end and the at least one groove in the second open end are dimensioned to receive a retaining ring.

6. The dust boot of claim 1, wherein the body is dome shaped.

7. The dust boot of claim 6, wherein the at least one relief vent extends circumferentially on the body.

8. The boot of claim 1, further comprising:
- a second protective barrier that is positioned on the outer surface of the body and is equidistant from the at least one protective barrier on the outer surface of the body.

9. A ball joint assembly comprising:
- a ball stud that has an elongated portion configured for connecting with a suspension member and a ball portion opposite to the elongated portion;
- a housing that includes a cavity that is dimensioned and configured to receive the ball portion of the ball stud;
- a boot having:
  - a first open end that is configured to couple to the housing;
  - a second open end that is configured to couple to the elongated portion of the ball stud;
  - a dome shaped body portion that extends between the first open end and the second open end, defines an interior cavity and at least one aperture that extends through the dome shaped body portion into the interior cavity of the body portion; and,
- at least one protective barrier that extends from an exterior surface of the dome shaped body portion and surrounds the at least one aperture;
- wherein the at least one protective barrier comprises: a plurality of walls that define a projection on the outer surface of the body that surrounds the at least one aperture; and, at least one of the plurality of walls that define the projection includes a dependent extension.

10. The ball joint assembly of claim 9 further comprising a projection that is positioned on the dome shaped body portion opposite to the protective barrier.

11. The ball joint assembly of claim 9 further comprising a second aperture that extends through the dome shaped body portion into the interior cavity of the dome shaped body portion and a second protective barrier that surrounds the second aperture.

12. The ball joint assembly of claim 11 further comprising a projection that is positioned on the dome shaped body portion and is equidistant from the at least one protective barrier and the second protective barrier.

13. The joint assembly of claim 12, wherein the plurality of walls of the at least one protective barrier and the second protective barrier have outer surfaces that are parallel to the dome shaped body portion.

\* \* \* \* \*